US007107192B1

(12) United States Patent
Cung et al.

(10) Patent No.: US 7,107,192 B1
(45) Date of Patent: Sep. 12, 2006

(54) METHOD FOR COMPUTING MODELS BASED ON ATTRIBUTES SELECTED BY ENTROPY

(75) Inventors: Quan G. Cung, Austin, TX (US); Harry Roger Kolar, Scottsdale, AZ (US); Kevin Eric Norsworthy, Austin, TX (US); Julio Ortega, The Colony, TX (US); Frederick J. Scheibl, Austin, TX (US); Vasken Torossian, Round Rock, TX (US); Ben Peter Yuhas, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 09/282,619

(22) Filed: Mar. 31, 1999

(51) Int. Cl.
*G06F 17/10* (2006.01)

(52) U.S. Cl. ............................... 703/2; 382/224; 703/1; 703/6; 703/22

(58) Field of Classification Search .................. 706/12; 703/2, 22, 1, 6; 382/224
See application file for complete search history.

(56) References Cited

U.S. PATENT DOCUMENTS

| 5,692,107 | A  | * | 11/1997 | Simoudis et al. ............. 706/12 |
| 6,199,098 | B1 |   | 3/2001  | Jones et al. |
| 6,301,586 | B1 |   | 10/2001 | Yang et al. |
| 6,356,898 | B1 |   | 3/2002  | Cohen et al. |
| 6,389,168 | B1 | * | 5/2002  | Altunbasak et al. ........ 382/224 |

OTHER PUBLICATIONS

Piatetsky-Shapiro, "Discovery, Analysis, and Presentation of Strong Rules", in "Knowledge Discovery in Database", AAAI/MIT Press, 1991, pp. 229-248.*

Dash et al., "Dimensionality Reduction of Unsupervised Data", Proceedings, Ninth IEEE International Conference on Tools with Artificial Intelligence, Nov. 1997, pp. 532-539.*
Agrawal et al. "Mining Association Rules between Sets of Items in Large Databases", Proceedings of the 1993 ACM SIGMOD International Conference on Management of Data, Jun. 1993, vol. 22, Issue 2, pp. 207-216.*
Kononenko et al., "Attribute Selection for Modelling", Future Generation Computer Systems, vol. 13, Issues 2-3, Nov. 1997, pp. 181-195.*
U.S. Appl. No. 09/282,620, filed Mar. 31, 1999, Related Co-Pending Application Brenda A. Acosta, et al.
U.S. Appl. No. 09/282,622, filed Mar. 31, 1999, Related Co-Pending Application Vasken Torossian.
U.S. Appl. No. 09/282,682, filed Mar. 31, 1999, Related Co-Pending Application Quan C. Cung, et al.
*WAI Accessibility User Agent Guidelines: Drowser User Interface,* www.w3.org/WAI/UA/WD-WAI-UA-BROWSER-0507.htm, May 1998.

* cited by examiner

*Primary Examiner*—Kamini Shah
*Assistant Examiner*—Herng-der Day
(74) *Attorney, Agent, or Firm*—Marilyn S. Dawkins; Dillon & Yudell LLP

(57) ABSTRACT

Attributes of a data set to be employed in generating a predictive model are analyzed based on entropy, chi-square, or similar statistical measure. A target group of samples exhibiting one or more desired attributes is identified, then remaining attribute values for the target group are compared to corresponding attribute values for the whole sample population. A subset of all available attributes is then selected from those attributes which exhibit, when comparing attribute values of target group samples to attribute values for the whole sample population, the greatest relative difference or divergence. This subset is employed to generate the predictive model. Efficiency in generating the predictive model and the accuracy of the resulting predictive model is improved, since fewer attributes are employed and less computational resources are required.

18 Claims, 3 Drawing Sheets

METHOD FOR COMPUTING MODELS BASED ON ATTRIBUTES SELECTED BY ENTROPY

RELATED APPLICATIONS

The present invention is related to the subject matter of the following commonly assigned, copending U.S. patent applications: Ser. No. 09/282,622 entitled "COMPILING MESSAGE CATALOGS FOR CLIENT-SIDE CONSUMPTION" and filed Mar. 31, 1999; Ser. No. 09/282,620 entitled "DYNAMIC SCREEN CONTROL" and filed Mar. 31, 1999; and Ser. No. 09,282,682 entitled "METHOD OF CUSTOMIZING SCREEN AND APPLICATION BEHAVIOR USING ATTRIBUTE METADATA IN AN APPLICATION DATABASE" and filed Mar. 31, 1999. The content of the above-referenced applications is incorporated herein by reference.

BACKGROUND OF THE INVENTION

1. Technical Field

The present invention relates in general to data analysis and in particular to qualifying sample populations employed in predictive data analysis. Still more particularly, the present invention relates to reducing the number of attributes of a sample population employed in generating a predictive model based on the sample population.

2. Description of the Related Art

A wide array of subjects are the focus of contemporary data collection, such as customer data which is collected by various industries, medical information which is collected for development of diagnostics and treatment protocols, or data relating to insurable or potentially insurable activities which is collected for insurance risk assessment. Collection of such data has become so routine and pervasive that "data mining" is frequently required to separate useful information from dross.

Data collection is frequently undertaken for the purposes of developing predictive models. That is, by statistical analysis of characteristics of a sample population, attempts are made to derive models which may predict, with reasonable accuracy, whether an individual subject will exhibit a characteristic or group of characteristics of interest based on known characteristics of that subject. For instance, marketing firms may attempt to develop predictive models for determining which individuals within a target population are most likely to respond to a particular promotional campaign.

Contemporary data collection generally proceeds more or less indiscriminately. That is, those engaged in collection of data typically collect as much data regarding each individual subject as possible, without regard to the ultimate usefulness of the data in, for example, developing a predictive model. This may result from uncertainty regarding which characteristics are most useful for a particular purpose and/or the simplistic conviction that more data will produce better results. More frequently, however, indiscriminate data collection results instead from the use of a data set for more than one purpose, spreading the cost of the data collection among multiple projects.

One effect of indiscriminate data collection on the development of predictive models is the inefficiency and error introduced by large data samples. A sample population may include data for five hundred or more characteristics of each individual subject within the sample population. Attempting to generate a predictive model based on that many individual characteristics is computationally inefficient. Furthermore, as the number of characteristics or attributes employed in generating the predictive model increases, the probability that the sample population is skewed by one or more characteristics or attributes also increases.

It would be desirable, therefore, to provide a mechanism for preprocessing a sample population to reduce the number of attributes or characteristics employed in generating a predictive model. It would further be advantageous if the mechanism eliminated characteristics which might skew the sample population and thereby degrade the accuracy of a predictive model generated from such data.

SUMMARY OF THE INVENTION

It is therefore one object of the present invention to provide improved data analysis.

It is another object of the present invention to provide improved qualification of sample populations employed in predictive data analysis.

It is yet another object of the present invention to provide a technique for reducing the number of attributes of a sample population employed in generating a predictive model based on the sample population.

The foregoing objects are achieved as is now described. Attributes of a data set to be employed in generating a predictive model are analyzed based on entropy, chi-square, or similar statistical measure. A target group of samples exhibiting one or more desired attributes is identified, then remaining attribute values for the target group are compared to corresponding attribute values for the whole sample population. A subset of all available attributes is then selected from those attributes which exhibit, when comparing attribute values of target group samples to attribute values for the whole sample population, the greatest relative difference or divergence. That is, an attribute for which the target group samples exhibit, for example, only two of all possible values is selected in preference to an attribute for which the target group samples exhibit three or more of the possible values. This subset is employed to generate the predictive model. Efficiency in generating the predictive model is improved, since fewer attributes are employed and less computational resources are required. Accuracy of the resulting predictive model is also improved since attributes potentially skewing the sample population in a manner least related to the desired attribute are eliminated from consideration in developing the model.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
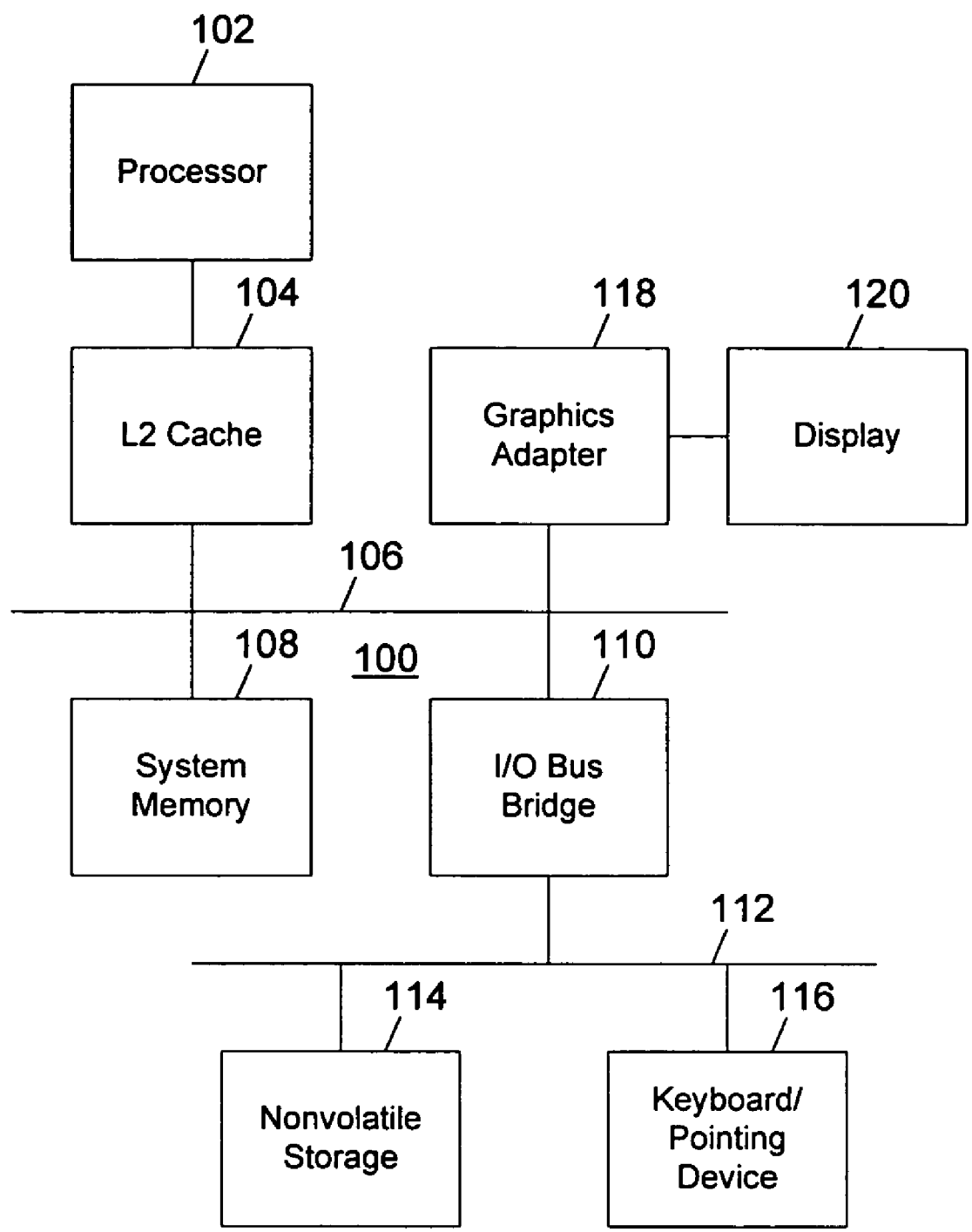
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the models of personal computers available from International Business Machines Corporation of Armonk, N.Y. Data processing system 100 includes a processor 102, which in the exemplary embodiment is connected to a level two (L2) cache 104, connected in turn to a system bus 106. In the exemplary embodiment, data processing system 100 includes graphics adapter 118 also connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. However, data processing system 100 is preferably programmed to provide a mechanism for preprocessing a sample population to be employed in generating a predictive model by reducing the number of attributes of the sample population which are utilized in generating the predictive model.

Figure 2:
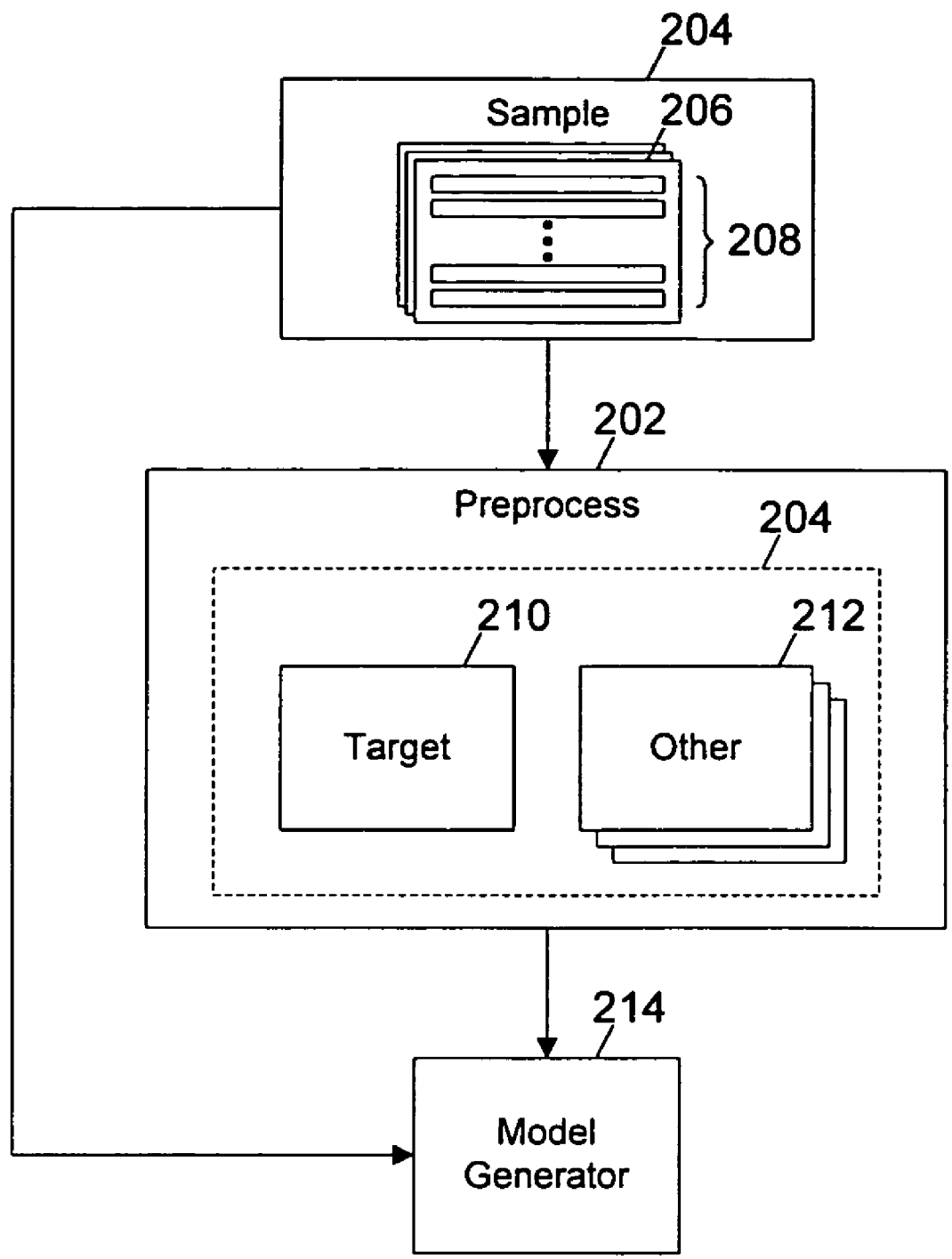
FIG. 2 is a logical block diagram for a mechanism for preprocessing a sample population to be employed in generating a predictive model in accordance with a preferred embodiment of the present invention.

Referring to FIG. 2, a logical block diagram for a mechanism for preprocessing a sample population to be employed in generating a predictive model in accordance with a preferred embodiment of the present invention is illustrated. The mechanism 200 includes a preprocessing module 202 which receives a sample 204. Sample 204 is preferably a relational database containing a number of data elements 206 (rows). Each data element 206 includes various attributes 208 or characteristics (columns). In the example contemplated, sample 204 may contain any arbitrary number of data elements, and the number of attributes 208 of each data element 206 may equal or exceed 500.

Preprocessing module 202 receives sample 204 in which at least some data elements possess a desired attribute or group of attributes, which may be referred to as a "target" data set. Module 202 then selects other attributes for data elements within sample 204 to be used in generating a predictive model by statistically analyzes sample 204 to determine which attributes of the target data elements differ the most from corresponding attributes of the sample population as a whole. The attributes for which sample instances having a desired characteristic have values which are the most different from corresponding attribute values of the sample population generally are selected.

For the purposes of this description only, and without intended to imply any limitations to the present invention, sample 204 may be viewed as logically divided within module 202 into a target group 210 and one or more other groups 212 based on the value of a specific attribute. Data elements within sample 204 having the desired attribute value or values are categorized in target group 210; data elements within sample 204 not having the desired attribute or attributes are categorized in one of the other groups 212. The other attributes—those not forming the basis of logical division of sample 204—of target group 210 are then compared to the attributes of entire sample 204 to determine which attributes exhibit the largest difference between target group 210 and sample 204.

For example, suppose an attribute A may have three possible values: "Y," "N," and "UNKNOWN." If the interest lies in building a predictive model to predict when attribute A will have the value "Y." Samples having the value "Y" for attribute A are therefore categorized as target group 210. The remaining attributes B, C and D for the samples are then compared, with the attribute values within target group 210 being compared to the attribute values for entire sample 204. Attributes with the largest difference between the target group 210 and the entire sample 204 are selected.

Suppose attribute B, for instance, has five possible values within sample 204, but target group 210 only includes two of those values for attribute B among constituent samples. Similarly, attribute C also has five possible values, four of which are exhibited by members of target group 210. Attribute D has ten difference values within sample 204, but only three of those values are found for attribute D within target group 210. In this case, attribute B has a larger relative difference between target group 210 and sample 204 than attribute C, since it has less overlap in attribute values. Attribute D exhibits a greater difference or divergence between samples having the desired attribute and the whole sample population than either of attributes B or C. Thus, attribute D would be selected in preference to attributes B or C in generating a predictive model, and attribute B would be chosen over attribute C.

The example described above utilizes four attributes and a relatively small number of possible values for each attribute. In practice, however, the process described may be applied to samples each having 500 or more attributes, with as many possible attribute values as there are samples for some attributes. Known statistical parameters such as entropy:

$$H(p_1, \ldots, p_n) = -\sum_{i=1}^{n} p_i \log p_i$$

and/or chi-square may be utilized to evaluate the attributes to determine which exhibit the greatest difference.

In the exemplary embodiment contemplated, a predetermined number of attributes (e.g., ten) which exhibit the greatest difference with respect to attribute values, other than those for the desired attribute or group of attributes, for the target group 210 versus the entire sample 204 is selected. However, any arbitrarily sized subset of attributes selected based on entropy may be employed. Additionally, the number of attributes selected for employment in generating a predictive model need not be a fixed size, but may instead be a percentage of the total number of attributes, or only those attributes in which the values for sample instances having the desired characteristic exhibit a threshold amount of difference from the corresponding attribute values for the entire sample population.

Once the attributes which are to be employed in generating a predictive model have been selected as described above, module 202 identifies the selected attributes (e.g., by a list of attribute names) for model generator 214. Model generator 214 may then generate a predictive model based on sample 204 utilizing the selected attributes in accordance with techniques known to those skilled in the art.

Figure 3:
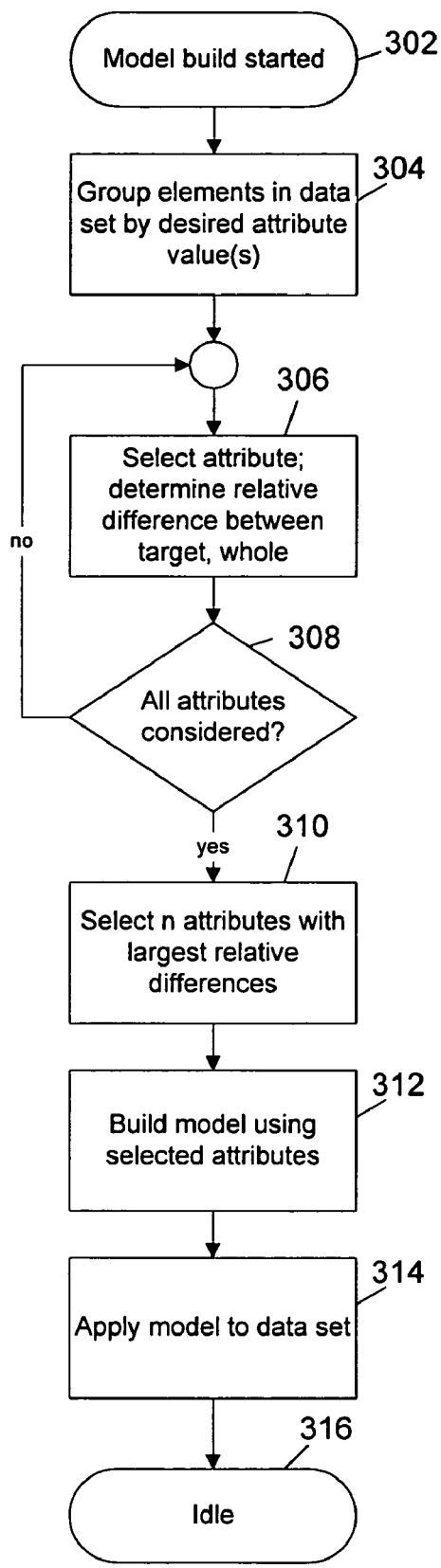
FIG. 3 depicts a high level flow chart for a process of selecting attributes of a sample for generating a predictive model in accordance with a preferred embodiment of the present invention.

With reference now to FIG. 3, a high level flow chart for a process of selecting attributes of a sample for generating a predictive model in accordance with a preferred embodiment of the present invention is depicted. The process begins at step 302, which depicts a model build being initiated. A data set, from which a sample population may be drawn including at least one sample having a desired attribute, should be available for building the desired predictive model. If less than the entire data set is employed in generating the predictive model, the resulting predictive model may then be applied to the remaining samples in the data set. The desired attribute(s) for which the predictive model is generated need not have only two possible values (e.g., gender), but may be a relative measure such as a value exceeding a predetermined threshold (e.g., monthly usage of a service).

The process first passes to step 304, which illustrates grouping the elements of the sample population based on the values of the attribute(s) to be the subject of prediction, identifying a target group of samples. The process then passes to step 306, which depicts selecting an attribute and determining a relative difference or divergence in the attribute values for target group samples versus the whole sample population. A relative difference (e.g., ratio or percentage) should be determined since comparison of absolute differences may not be meaningful.

The process then passes to step 308, which illustrates a determination of whether all attributes available for the sample population, other than those for which the predictive model is being built, have been considered. If all attributes for the sample population have not been considered, the process returns to step 306 to select another attribute for analysis and repeat the process of steps 306 with the newly selected attribute.

Once all attributes for the sample population have been analyzed, the process proceeds from step 308 to step 310, which depicts selecting n attributes exhibiting the largest relative differences for samples having the desired attributes as compared to all samples within the sample population. A sort or ranking of the attributes by such relative difference may be useful in this step. The number n of attributes selected may be any arbitrarily set number or, as described above, may be a predetermined percentage of the attributes or attributes exhibiting a relative difference between samples which exceeds a predetermined threshold.

The process next passes to step 312, which illustrates building a model for the desired attribute and the sample population utilizing the selected attributes. Various known techniques may be employed for this purpose. The process passes then to step 314, which depicts applying the predictive model generated to a data set. Finally, the process passes to step 316, which illustrates the process becoming idle until another model build is undertaken.

The present invention allows data collections have large numbers of potentially irrelevant or meaningless attributes for each sample to be employed in building an accurate predictive model. Efficiency in generating the predictive model is improved by reducing the number of attributes which are considered during the model build. This requires both less time and less computational resources to generate the predictive model. Accuracy of the resulting predictive model is also improved. Attributes which might skew the sample population but have no relation to the desired characteristic—or less relation to the desired attribute than other attributes—are eliminated from consideration in building the predictive model.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of reducing the number of the number of attributes and respective values of a sample population employed in generating a predictive model, said method comprising the steps of:

obtaining one or more desired attributes and respective values;

comparing said one or more desired attributes and respective values with said sample population to obtain a target population;

determining a statistical measure of difference between each of the attributes and respective values of said target population and the attributes and respective values of the sample population; and utilizing said statistical measure of difference to reduce the number of attributes and respective values of said sample population.

2. The method of claim 1, wherein the step of determining a statistical measure of difference further comprises:

determining an entropy for the attribute values.

3. The method of claim 1, wherein the step of utilizing said statistical measure to reduce the number of attributes and respective values of said population further comprises:

identifying n attributes having a largest difference in respective values with said target population.

4. The method of claim 1, wherein the step of utilizing said statistical measure to reduce the number of attributes and respective values of said population further comprises:

identifying a predetermined percentage of attributes and respective values having a larger statistical measure of difference than remaining attributes and respective values.

5. The method of claim 1, wherein the step of utilizing said statistical measure to reduce the number of attributes and respective values of said population further comprises:

identifying attributes and respective values where said statistical measure of difference exceeds a predetermined amount.

6. A method of selecting attributes for computing a model, comprising:

for a plurality of samples each having values for a plurality of attributes:

for each of the plurality of attributes:

comparing the attribute values for a target group of samples to the attribute values for all of the plurality of samples; and determining a difference between the attribute values for the target groups and the attribute values for all of the plurality of samples; and identifying attributes within the plurality of attributes having a largest difference between the attribute values for the target groups and the attribute values for all of the plurality of samples; and selecting at least some of the identified attributes.

7. A system for selecting attributes for computing a model, comprising:

a memory containing data for a plurality of samples each having values for a plurality of attributes; and a processor coupled to the memory and executing a selection process including:

comparing attribute values for samples having a desired attribute value to attribute values for all samples;

selecting a subset of available attributes based on a difference between attribute values for the samples having the desired attribute value and attribute values for all of the samples; and employing the selected subset of attributes to generate a predictive model.

8. The system of claim 7, wherein the selection process determines a statistical measure of difference between the attribute values for samples having the desired attribute and the attribute values for all of the samples.

9. The system of claim 8, wherein the selection process determines an entropy for the attribute values.

10. The system of claim 7, wherein the selection process identifies a predetermined number of attributes having a largest difference in the attribute values for selection.

11. The system of claim 7, wherein the selection process identifies a predetermined percentage of attributes having a larger difference in the attribute values for selection.

12. The system of claim 7, wherein the selection process identifies, for selection, attributes having a difference in the attribute values exceeding a predetermined amount.

13. A system for computing a model, comprising:

a memory containing data for a plurality of samples each having values for a plurality of attributes; and a processor coupled to the memory and executing a selection process including:

comparing attribute values for a target subset of the plurality of samples to attribute values for all of the samples;

selecting attributes having a largest difference between attribute values for the target subset and attribute values for all of the samples; and computing a model employing the selected attributes.

14. A computer usable medium for selecting attributes for computing a model, said computer usable medium comprising:

computer program code for reading values of attributes for a plurality of samples;

computer program code for comparing attribute values for samples having a desired attribute value to attribute values for all samples; and computer program code for selecting a subset of available attributes based on a difference between attribute values for samples having the desired attribute value and attribute values for all samples.

15. The computer usable medium of claim 14, wherein the computer program code for comparing attribute values for samples having a desired attribute value to attribute values for all samples further comprise:

computer program code for determining a statistical measure of difference between the attribute values for samples having the desired attribute value and the attribute values for all samples.

16. The computer usable medium of claim 15, wherein the computer program code for determining a statistical measure of difference between the attribute values for samples having the desired attribute value and the attribute values for all samples further comprise:

computer program code for determining an entropy of the attribute values for samples having the desired attribute value and an entropy of the attribute values for all samples;

computer program code for comparing the entropy of the attribute values for samples having the desired attribute value to the entropy of the attribute values for all samples for each attribute to determine a relative measure of difference; and computer program code for comparing the relative measure of difference of all attributes.

17. The computer usable medium of claim 14, wherein the computer program code for selecting a subset of available attributes based on a difference between attribute values for samples having the desired attribute value and attribute values for all samples further comprise:

computer program code for identifying n attributes having a largest difference in the attribute values.

18. A computer usable medium for selecting attributes for computing a model, said computer usable medium comprising:

computer program code for comparing attribute values for a target group of samples to attribute values for all samples for each of a plurality of attributes;

computer program code for determining a difference between the attribute values for the target group of samples and the attribute values for all of the samples; and computer program code for selecting a group of attributes having a largest difference between the attribute values for the target group of samples and the attribute values for all samples.

\* \* \* \* \*